United States Patent
Hallenstvedt et al.

[19]

[11] Patent Number: 6,129,599
[45] Date of Patent: Oct. 10, 2000

[54] TRANSMISSION ASSEMBLY FOR A MARINE VESSEL

[76] Inventors: Oddbjörn Hallenstvedt, Ekstigen 4, 5-73160 Valskog; Staffan Månsson, Harestigen 3, 5-47160 Myggenas, both of Sweden

[21] Appl. No.: 09/210,108

[22] Filed: Dec. 11, 1998

Related U.S. Application Data

[63] Continuation of application No. 08/775,187, Dec. 30, 1996, abandoned.

[51] Int. Cl.⁷ .................................................... B60K 41/00
[52] U.S. Cl. ............................... 440/86; 440/75; 74/378; 192/87.18
[58] Field of Search ........................... 440/75; 192/87.18, 192/87.19; 74/335, 378

[56] References Cited

U.S. PATENT DOCUMENTS

| | | | |
|---|---|---|---|
| 4,295,792 | 10/1981 | Tachibana | 192/87.18 |
| 4,380,278 | 4/1983 | Lasken . | |
| 4,680,983 | 7/1987 | Brown | 74/335 |
| 4,843,902 | 7/1989 | Patton et al. . | |
| 4,871,048 | 10/1989 | Chatterjea | 192/87.19 |
| 4,966,044 | 10/1990 | Bowman et al. | 74/335 |
| 5,171,170 | 12/1992 | Ridder et al. . | |
| 5,267,157 | 11/1993 | Churchill et al. . | |
| 5,327,793 | 7/1994 | Hayasaka | 74/378 |
| 5,509,863 | 4/1996 | Mansson et al. | 74/378 |
| 5,651,289 | 7/1997 | Asada et al. | 74/335 |
| 5,682,791 | 11/1997 | Liesener | 74/335 |
| 5,709,130 | 1/1998 | Suzuki | 74/378 |

Primary Examiner—Jesus D. Sotelo
Attorney, Agent, or Firm—Royston, Rayzor, Vickery, Novak & Druce, L.L.P.

[57] ABSTRACT

An electrically controlled transmission system for a marine vessel that is adapted to avoid vibration to the vessel during a shifting process of the transmission system. The transmission system includes a marine vessel having an inboard motor and an outboard propulsion drive. The motor is coupled to the propulsion drive by the transmission assembly which is at least partially located within a portion of the outboard propulsion drive and is adapted to provide substantially vibration-free shifting of the transmission assembly. The transmission assembly has a drive shaft selectively engageable with at least a forward and reverse gear of the propulsion drive for establishing forward and reverse configurations of the transmission assembly, respectively. The transmission assembly is also electrically and remotely controlled from a distance therefrom between the forward and reverse configurations utilizing electrically actuatable solenoids. These solenoids are located proximate to the transmission assembly and are used for establishing the forward and reverse configurations of the transmission assembly thereby enabling the substantially vibration-free shifting in the transmission assembly. The actuable solenoids are interconnected with a hydraulic system for affecting the forward an reverse configurations. A first remote control is located away from the transmission assembly and is communicatively connected with the electrically actuatable solenoids for configuring the transmission assembly between the forward and reverse configurations, and a neutral configuration.

20 Claims, 5 Drawing Sheets

TRANSMISSION ASSEMBLY FOR A MARINE VESSEL

RELATED PATENT APPLICATIONS

This patent application is a continuation of U.S. patent application Ser. No. 08/775,187 filed Dec. 30, 1996 entitled VALVE ASSEMBLY, now abandoned said application in its entirety is hereby expressly incorporated by reference into the present application.

DESCRIPTION

1. Technical Field

The present invention relates to a transmission assembly for a marine vessel, and more particularly to a transmission assembly for a marine vessel that performs shifting functions and is controlled substantially vibration free from remote locations upon the vessel.

2. Background Art

In conventional inboard power transmissions, particularly for marine vessels, forward and reverse gear selection can be obtained by operating a valve assembly to direct hydraulic fluid to either one of a pair of multi-plate clutches carried on a horizontally or vertically disposed drive shaft. The drive shaft is ordinarily driven by a substantially horizontally disposed input shaft from the engine of the vessel. The input shaft is provided with a bevel gear which engages a pair of bevel gears associated with the multi-plate clutches on the drive shaft. The drive shaft is in turn connected to a propeller shaft.

The above-mentioned arrangement is particularly useful in marine vessels having an inboard mounted motor and having at least a portion of the transmission and propeller drive arranged in a unit which is pivotally attached to the stern of the vessel.

According to a known arrangement, the drive shaft is provided with internal passages for the conveyance of hydraulic fluid to the multi-plate clutches in response to operation of the transmission assembly for a marine vessel. In this way, either forward or reverse operation of the propeller shaft may be selected.

The valve assembly is disposed adjacent the drive shaft, and the hydraulic fluid is fed into the internal passages of the drive shaft. The conveyed fluid is controlled by the valve assembly, which in turn comprises a manually rotatable member for selectively guiding the fluid to one of the clutches.

Although the above-described known arrangement normally is reliable and effective, it suffers from a disadvantage in that high levels of vibration and noise can be transmitted from the drive and the transmission to other parts of the vessel via a control cable for the transmission; this vibration reduces the comfort of the passengers in the vessel. Another disadvantage of this arrangement is that since the rotatable member can only be connected to one single control unit via a wire, this control unit can only be operated from one location in the vessel.

The present invention provides an improved valve assembly for a marine transmission which does not suffer from the above vibration problem, and is more versatile than known assemblies.

In view of the above described deficiencies associated with the use of known designs for mechanically shifted power transmissions in marine vessels, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed transmission systems in a marine vessel and incorporates several additionally beneficial features.

In at least one embodiment, the present invention takes the form of an electrically controlled transmission system for a marine vessel that is adapted to avoid vibration to the vessel during actuation and completion of a shifting process of the transmission system. The transmission system includes a marine vessel having an inboard motor and an outboard propulsion drive. The motor is coupled to the propulsion drive by the transmission assembly which is at least partially located within a portion of the outboard propulsion drive and is adapted to provide substantially vibration-free shifting of the transmission assembly. The transmission assembly has a drive shaft selectively engageable with at least a forward and reverse gear of the propulsion drive for establishing forward and reverse configurations of the transmission assembly, respectively. The transmission assembly is also electrically and remotely controlled from a distance therefrom between the forward and reverse configurations utilizing electrically actuatable solenoids. These solenoids are located proximate to the transmission assembly and are used for establishing the forward and reverse configurations of the transmission assembly thereby enabling the substantially vibration-free shifting in the transmission assembly. The actuable solenoids are interconnected with a hydraulic system for affecting the forward an reverse configurations. A first remote control is located at a distance away from the transmission assembly and is communicatively connected with the electrically actuatable solenoids for configuring the transmission assembly between the forward and reverse configurations, and a neutral configuration.

Optionally, a second remote control may be located distantly away from the first remote control. The second remote control is similarly communicatively connected with the electrically actuatable solenoids for configuring the transmission assembly between the forward and reverse configurations, and a neutral configuration.

In at least one embodiment, electrically conductive wiring is interconnected between at least the first remote control and the electrically actuatable solenoids for establishing the communication therebetween. Also, the electrically actuatable solenoids may be located in the outboard propulsion drive.

In one possible embodiment, each of the forward and reverse gears of the transmission assembly is single ratio without a possibility for shifting between different ratio gears in either of the forward and reverse configurations. Optionally, the outboard propulsion drive is a stern propeller drive that is pivotally attached to a stern of the marine vessel.

Further, the present invention provides a valve assembly for the supply of hydraulic/lubricating fluid to a power transmission in a marine vessel, that is controlled by electric signals. The transmission assembly for a marine vessel includes a valve having a fluid outlet and at least one passage for conveying the fluid to the transmission. It also includes at least one electrically controlled valve element, communicating with the passage, for controlling the supply of the fluid to the transmission.

The invention further provides a method of operating a power transmission. The transmission has a valve assembly having at least one passage for conveying fluid. In the inventive method, the passage is opened or closed by an electrically controlled valve element communicating with the passage. Fluid is then supplied to the transmission through the passage when the passage is open to make the transmission operational.

The beneficial effects described above apply generally to the exemplary devices and mechanisms disclosed herein of the transmission assembly. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

Figure 1:
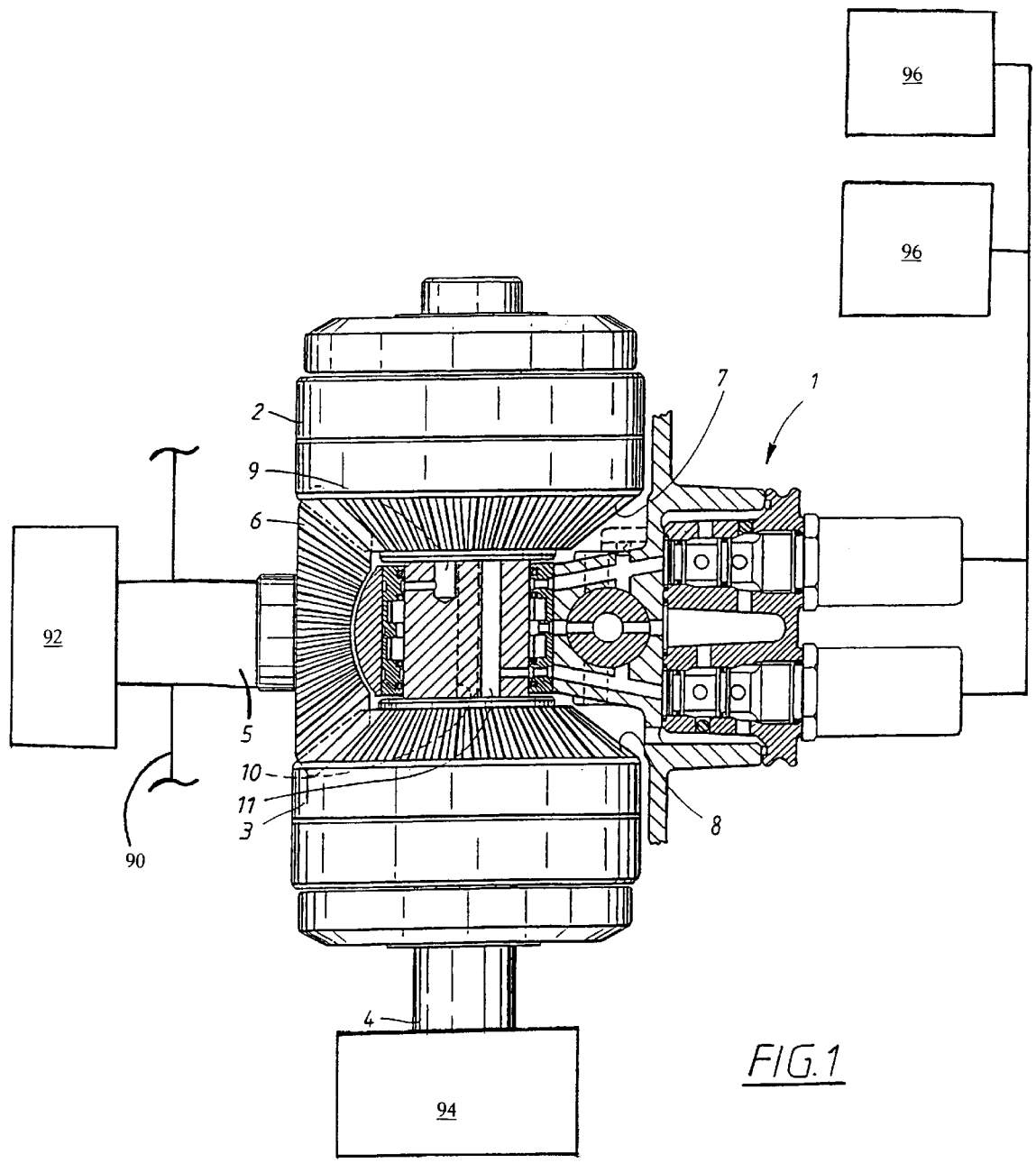
FIG. 1 is a partial schematic and partial sectional view through a power transmission incorporating a valve assembly according to the present invention.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other.

The invention includes a transmission having an electrically controlled valve element. Supplying or withholding the fluid by the valve element to the transmission determines the operational state of the transmission. The valve element is preferably of the piston-solenoid type. Preferably, the valve assembly has a first passage for conveying the fluid to the transmission to select a first predetermined gear and a second passage for conveying the fluid to the transmission to select a second predetermined gear. Each passage is provided with its own electrically controlled valve element, in communication therewith, for controlling the supply of the fluid. The valve elements may be provided with openings defining a vent passage, respectively, for venting the fluid to a fluid reservoir when the valve element is in a closed position and is not supplying fluid to the transmission.

In operation, the valve assembly may be provided with three positions. In the first position, the first valve element supplies the fluid via the first passage and thus selects the first gear (e.g., forward), while the second valve element vents fluid to the fluid reservoir, thus preventing selection of the second gear at the same time. Similarly, in the second position, the second valve element supplies the fluid via the second passage and thus selects the second gear (e.g., reverse), while the first valve element vents fluid to the fluid reservoir, thus preventing selection of the second gear at the same time. A third operational position may be provided, in which the first valve element closes the first passage and the second valve element closes the second passage, thereby selecting a neutral condition of the transmission.

The invention also includes a method of operating a power transmission of a marine vessel 90 that couples an inboard motor 92 coupled to an outboard propulsion drive 94 by means of an electrically controlled valve element or elements communicating with and opening/closing the above-mentioned passages. The advantage to using electrically controlled valve elements is that no heavy control cable is required from the transmission to the controller, as was in the prior configuration. Thus, vibration from the transmission will not be transmitted to the passenger area, and a smoother ride will be insured. Further, since the valves are controlled electrically, multiple control units may be easily and inexpensively provided around the vessel, thereby facilitating the control of the vessel.

As illustrated in FIG. 1, the present invention includes an inboard power transmission arrangement for a marine vessel provided with a valve assembly 1. In this arrangement, forward and reverse gear selection is obtained by operating the valve assembly 1 to direct hydraulic fluid to either one of a pair of multi-plate clutches 2, 3 carried on a substantially vertical drive shaft 4. The drive shaft 4 is driven by a substantially horizontally disposed input shaft 5 extending from the engine (not shown) of the vessel. The input shaft 5 is provided with a bevel gear 6 which in turn engages a pair of further bevel gears 7, 8 associated with the pair of multi-plate clutches, 2, 3 on the drive shaft 4. The drive shaft 4 is connected at its lower end with an output shaft (not shown) which is intended to drive a propeller in a known manner.

The drive shaft 4 is provided with three internal passages 9, 10, 11 for the conveyance of hydraulic fluid to the pair of multi-plate clutches 2, 3 in response to operation of the valve assembly 1, and for the conveyance of a lubricating fluid to the clutches 2, 3. The internal passages 9, 10, 11 will be described in greater detail below.

Figure 2:
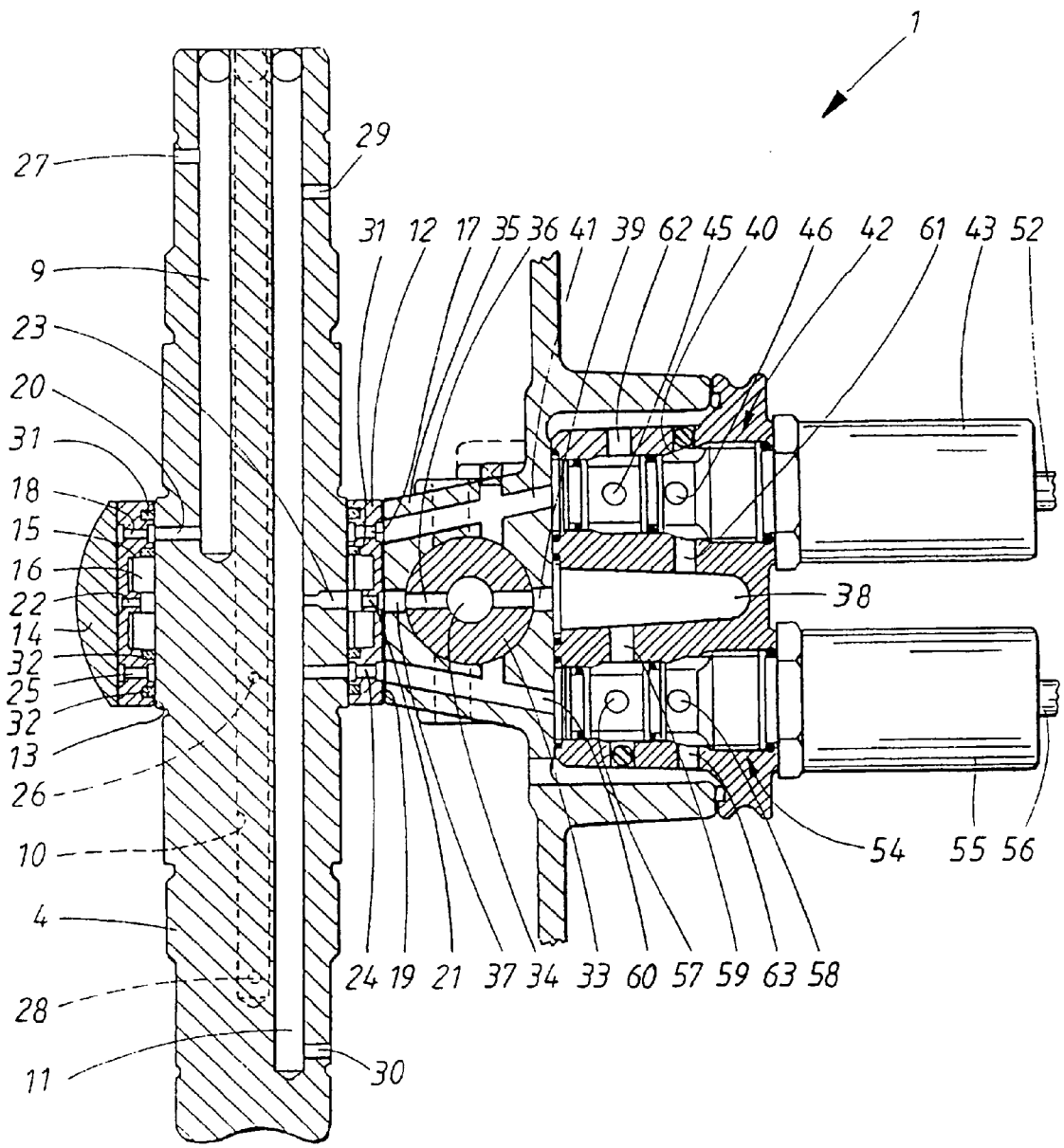
FIG. 2 is a sectional view through a valve assembly according to the present invention.

In the power transmission arrangement illustrated in FIGS. 1 and 2, the valve assembly 1 is arranged as a combined bearing and fluid supply device. Using the same reference numerals for like components, the valve assembly 1 is advantageously located between the pair of multi-plate clutches 2, 3. Although it is preferred to make use of multi-plate clutches, the invention may also be practiced using clutch mechanisms other than multi-plate clutches, for example single plate clutches.

As is most clearly illustrated in FIG. 2, the valve assembly 1 according to the invention comprises a generally cylindrical housing 12 having a circular opening extending therethrough, with the circular opening being delimited by an inner surface 13 of the housing 12. The housing 12 is adapted to be press fitted into a support element 14, with the support element 14 housing the valve assembly 1. The inner surface 13 of the housing 12 is provided with at least one first circumferential channel 15 which accommodates bearings 16 such as roller bearings, ball bearings, taper bearings, or plain bearings. As shown in FIGS. 1 and 2, the housing 12 preferably accommodates a pair of roller bearings 16 which are axially spaced along the drive shaft 4 and adapted to support the drive shaft 4 passing through the circular opening in the housing 12.

Furthermore, the housing 12 comprises a first bore 17 extending radially from a second circumferential channel 18 in the inner surface 13 to a location on an outer surface 19. Fluid is conveyed from valve assembly 1 to first bore 17, on to second circumferential channel 18, and then to first hole 20 (the hole being disposed in drive shaft 4). First hole 20 conveys the fluid to first internal passage 9 in drive shaft 4 and, the first internal passage 9 communicates with the upper multi-plate clutch 2.

The housing 12 further comprises a second bore 21 extending radially from the inner surface 13 to a location on the outer surface 19. The second bore 21 preferably communicates with a third circumferential channel 22, preferably disposed between bearings 16 in the housing 12 is conveyed from second bore 21 to third circumferential channel 22, and then to second hole 23 (the hole being disposed in drive shaft 4). Second hole 23 conveys the fluid to third internal passage 11, which supplies fluid to both clutches 2 and 3 for lubrication. Simultaneously, by locating the third circumferential channel 22 between the axially spaced bearings 16, lubricating fluid contacts the bearings, and lubrication of the bearings is ensured.

The housing 12 preferably comprises a third bore 24 extending radially from a fourth circumferential channel 25 in the housing 12. Fluid is conveyed from third bore 24 to fourth circumferential change 25, and then on to third hole 26 (the hole being disposed in drive shaft 4). Third hole 26 conveys the fluid to second internal passage 10.

First internal passage 9 communicates with upper multi-plate clutch 2 via a bore 27 in draft shaft 4, whereas second internal passage 10 communicates with lower multi-plate clutch 3 via another bore 28 in the drive shaft 4. Furthermore, third internal passage 11 communicates with lubricating ducts in the upper and lower clutches 2 and 3 via bores 29 and 30.

Preferably, the second and fourth circumferentially extending channels 18 and 25 are axially separated by the bearing means 16.

In order to ensure that fluid from the valve assembly 1 is reliably conveyed to its intended destinations, the second circumferential channel 18 is located between a first pair of sealing rings 31 accommodated in first circumferential grooves in the inner surface 13. Similarly, the fourth circumferential channel 25 is located between a second pair of sealing rings 32 accommodated in second circumferential grooves in the inner surface 13. Preferably, the sealing rings 31 and 32 are made from sintered bronze having a low-friction coating. The low-friction coating may be of TEFLON® material, for example.

The supply of fluid to the first, second, and third bores 17, 21, and 24 is controlled by the valve assembly 1. More specifically, the valve assembly 1 comprises a generally cylindrical valve member 33 having an internal fluid supply passageway 34 which receives fluid from a pump (not shown) and thereby functions as a fluid outlet. Depending on the power and torque output of the engine in the vessel to which the transmission arrangement is mounted, the fluid is supplied to the valve assembly 1 at a pressure which is preferably approximately 10 to 25 bar.

The generally cylindrical valve member 33 is arranged in a valve housing 35 connected to the housing 12. The valve member 33 is provided with a through bore 36 which functions as a passage for fluid to be conveyed to the housing 12, via a first passageway 37 connecting to the second bore 21. The valve member 33 also functions as a passage for fluid to be conveyed to a rear fluid chamber 38, via a second passageway 39. The rear fluid chamber 38 can be connected to the first bore 17 via an upper valve chamber 40 and a third passageway 41 in a manner which will be described below. This connection can be opened by means of a first valve element 42, which according to this embodiment comprises a first electrically operable solenoid device 43.

Figure 3A:
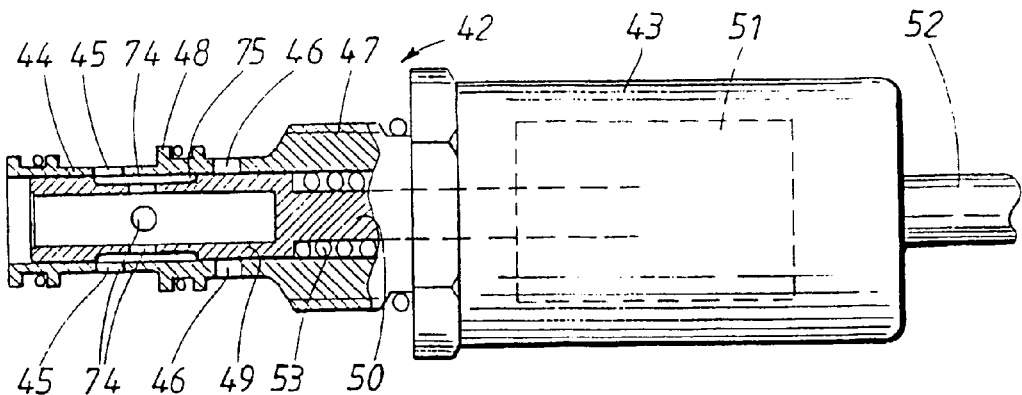
FIG. 3a illustrates, on a larger scale, a valve element to be used in the present invention, in a first position.
Figure 3B:
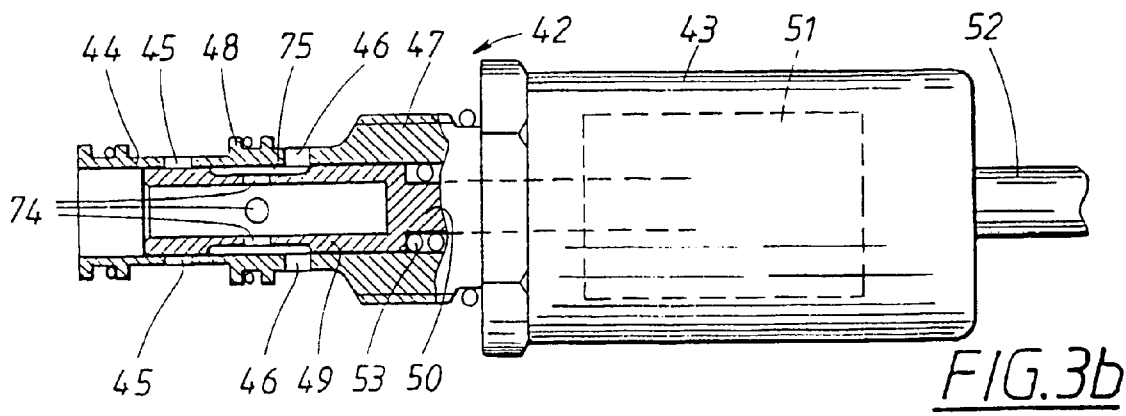
FIG. 3b illustrates the valve element according to FIG. 3a, but in a second position.

The first valve element 42 is shown separately in FIGS. 3a and 3b. As is shown in FIG. 3a, the valve element 42 comprises a first, generally cylindrical portion 44 which is provided with first and second sets of holes 45 and 46 axially spaced from each other. The valve element 42 also comprises a second generally cylindrical portion 47 having a diameter which is larger than that of the first cylindrical portion 44. Between the sets of holes 45 and 46 is disposed a circumferentially extending partition and sealing element 48.

An essentially cylindrical piston 49 is arranged inside the first cylindrical portion 44 in a manner so as to be slidable between two positions in which it covers either the first set of holes 45 or the second set of holes 46. Piston element 49 is connected to a plunger 50 which forms part of solenoid device 43 and which is adapted to be forced out of an armature 51 of solenoid 43 when electric power is supplied via an electrical connection 52. Solenoid 43 also comprises a spring element 53 which urges plunger 50 in a direction away from the armature 51, i.e., the leftwards direction in FIG. 3a. Solenoid 43 can be a conventional solenoid, the operation of which is known, and is therefore not described here.

FIG. 3a illustrates the piston 49 covering the second set of holes 46, indicating that no passage of any fluid is possible through the second set of holes 46 towards the inside of the piston 49. This is the position which the piston 49 adopts when no electric power is supplied to the solenoid 43, i.e., when the spring 53 urges the piston 49 to its leftmost position. In this condition a transport of fluid is instead obtained via the first set of holes 45 and via a third set of holes 74 arranged along the periphery of the piston 49. In this manner, a transport of fluid to the inside of the piston 49 is obtained.

FIG. 3b illustrates the position of the piston element 49 when electric power is applied to the solenoid 43. In this condition, the plunger 50 is forced against the action of the spring 53 in the rightwards direction to a position in which the piston element 49 covers the first set of holes 45. This position corresponds to a condition in which no passage of fluid is possible via the first set of holes 45. On the other hand, in the position of the piston element 49 shown in FIG. 3b, the second set of holes 46 are open for passage of fluid. More specifically, fluid may pass via the second set of holes 46 and the third set of holes 74 to the inside of the piston element 49.

Furthermore, as is apparent from FIGS. 3a and 3b, the piston element 49 is provided with a circumferentially extending recess 75, which provides a passage for fluid from either one of the first or second sets of holes 45, 46, depending on which position the piston element 49 adopts. Since the recess 75 also extends in the axial direction, the stroke of the piston element 49 can be made relatively short.

Returning to FIG. 2, it will be apparent that the valve assembly 1 is also provided with a second valve element 54 and a second electrically operable solenoid device 55. The function of these elements are the same as that described above with reference to FIGS. 3a and 3b. A control unit (not shown) controls the solenoid devices 43 and 55 via electrical connections 52 and 56. The second valve element 54 is provided with holes 57 and 58, having a function which corresponds to that of holes 45 and 46 described above. It should be noted that although FIG. 2 only shows one each of the holes 45, 46, 57, 58, these holes may also be in the form of four sets of holes, corresponding to that shown in FIGS. 3a and 3b. The operation of the control unit for controlling the solenoid devices will be described in greater detail below.

The valve assembly 1 according to the embodiment shown in FIG. 2 is provided with a so-called "take me home" function. This is an important safety feature of the invention which assures that, when no voltage is applied to the solenoids 43, 55, the power transmission as a default function selects the forward gear of the transmission. Such a situation may occur as a result of a power failure when the vessel is at sea.

Accordingly, with reference to FIG. 2, when no voltage is supplied to either one of the solenoids 43, 55, hydraulic fluid will be supplied from the internal fluid supply passageway 34, via the rear fluid chamber 38 and into a fourth passageway 59. Since the piston element (not shown) of the second solenoid 55 is in its normal position (i.e., a position corresponding to the position of the first solenoid 43 shown in FIG. 3a), hole 57 will be open for passage of fluid. Thus, the fluid will be conveyed through hole 57, on to fifth passageway 60, and into the third bore 24. Thus, the fluid will be conveyed to the second internal passage 10 which cooperates with the lower multi-plate clutch 3, so that the forward gear is selected.

In this mode of operation, fluid from the fluid chamber 38 will also be conveyed into the upper valve chamber 40 via a sixth passageway 61. However, the fluid will not be conveyed any further, since the second set of holes 46 of the first valve element 42 blocked (cf. FIG. 3a). Furthermore, hydraulic fluid present in the third passageway 41 will be conveyed via the first set of holes 45 (which is open since the solenoid 52 is not energized) to a first vent passage 62. The fluid is directed via first vent passage 62 to an oil reservoir (not shown).

In a second mode of operation, both the solenoids are energized by means of the control unit. This means that the second set of holes 46 of the first valve element 42 is open for passage of fluid (cf. FIG. 3b). Consequently, fluid will be conveyed from fluid chamber 38, via sixth passageway 61, holes 46, and third passageway 41, to first bore 17. This means that fluid will be conveyed to the first internal passage 9 which cooperates with the upper multi-plate clutch 2, thereby selecting the reverse gear. In this mode of operation, no fluid will pass through the first set of holes 57 of the second valve element 54. Furthermore, in this mode of operation fluid which is present in the fifth passageway 60 is conveyed through holes 58 (which are now open) to a second vent passage 63. The fluid is directed via the second vent passage 63 to an oil reservoir (not shown).

In a third mode of operation, the second solenoid 54 is energized but not the first solenoid 43. In this mode, no fluid in the fluid chamber 38 may pass through either one of the first of holes 57 of the second valve element 54 or the second set of holes 46 of the first valve element 42. This means that a neutral condition is selected in which neither of the clutches 2, 3, (cf. FIG. 1) will be activated. This implies that any rotation of the input shaft 5 will not be transferred to the drive shaft 4.

Figure 4:
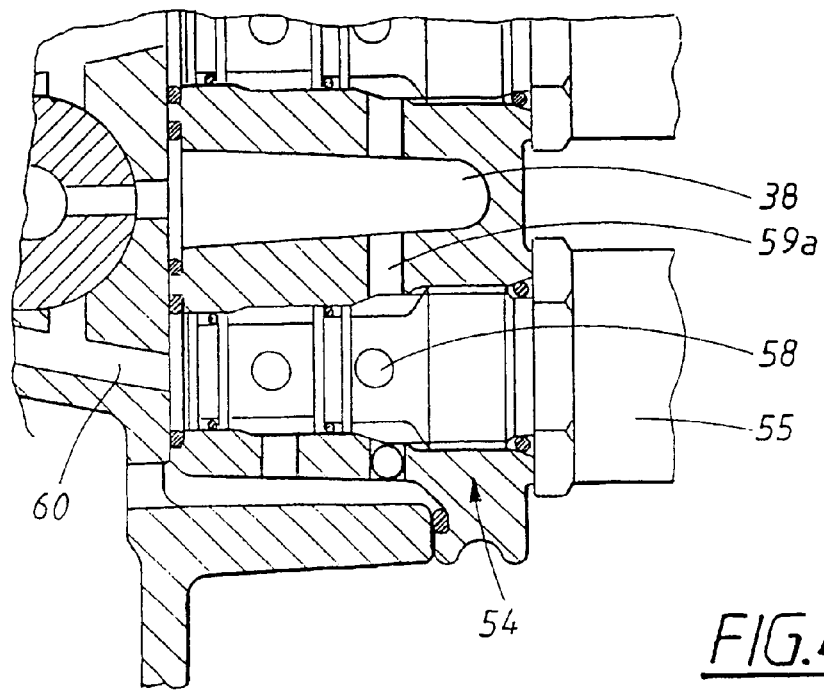
FIG. 4 is a partial view of a valve assembly illustrating an alternative embodiment of the invention.

According to a further embodiment of the valve assembly 1 according to the invention which is shown in FIG. 4, the valve assembly 1 can also be operated so as to provide a neutral condition of the transmission in the case where no power is supplied to either one of the solenoids 43, 55. According to this embodiment, an alternative fourth passageway 59a is arranged so as to provide a connection from the fluid chamber 38 to the fifth passageway 60, via the second set of holes 58 of the second valve element. Accordingly, the neutral condition is selected when no power is supplied, which can be desirable in certain situations. Furthermore, forward gear is selected when only the second solenoid 55 is energized, whereas reverse gear is selected when only the first solenoid 43 is energized.

Figure 5:
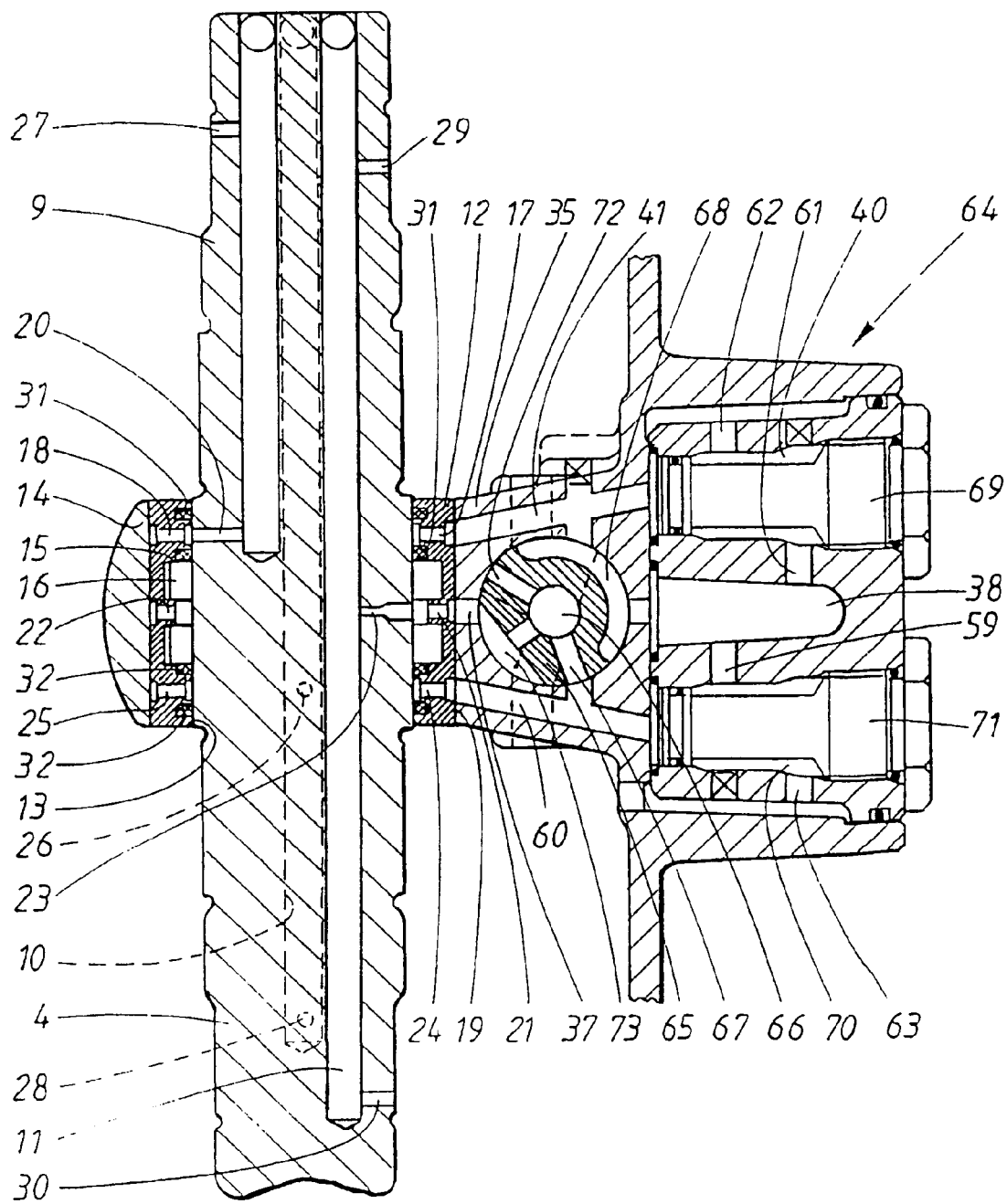
FIG. 5 is a sectional view through the valve assembly according to an alternative embodiment of the present invention.

A further embodiment of the invention is shown in FIG. 5. Using the same reference numerals for like components, the valve assembly 64 according to this embodiment is not intended to be operated by means of any solenoid devices, but instead is manually controllable. To this end, a rotatable valve member 65 is arranged in a valve housing 35 connected to the housing 12. The valve member 65 is provided with a through bore 66 which functions as a passage for fluid from a fluid pump (now shown) to be conveyed to the housing 12.

The valve member 65 is intended to be manually rotated between three different positions, one of which is illustrated in FIG. 5. In this position the forward gear of the transmission is selected, in the following manner. Hydraulic fluid is supplied via the internal fluid supply passage 66 and a first valve member bore 67 to the fifth passageway 60 and further to the third bore 24. In this manner, the fluid will be conveyed to the second internal passage 10 which cooperates with the lower multi-plate clutch 3, so that the forward gear is selected.

Simultaneously, fluid being present in the third passageway 41 will be conveyed to the rear fluid chamber 38 via a peripherally extending channel 68 in the valve member 65. From the fluid chamber 38 the fluid is conveyed, via the sixth passageway 61 and the first vent passage 62, to an oil reservoir (not shown). The fluid is also conveyed, via the fourth passageway 59 and the second vent passage 63 to said oil reservoir. To this end, the upper valve chamber 40, through which the fluid is conveyed, is plugged by means of a first blocking element 69 which is essentially of the same shape as the first valve element 42 as described above, and can be screwed into the upper valve chamber 40. The left and right ends of the blocking element 69 do not allow any passage of fluid. In a similar manner, a lower valve chamber 70 is plugged by means of a second blocking element 71.

In order to engage reverse gear, the valve member 65 is rotated clockwise approximately 60 degrees to a position in which a second valve member bore 72 is brought into communication with the third passageway 41. In this position of the valve member 65 fluid is conducted from the internal fluid supply passage 66 to the first bore 17. In this manner, fluid will be conveyed to the first internal passage 9 which cooperates with the upper multi-plate clutch 2, thereby selecting the reverse gear. Simultaneously, fluid present in the fifth passageway 60 will be conveyed via the channel 68 in the valve member 65 to the fluid chamber 38, and further on to the oil reservoir in a manner similar to that described above.

Furthermore, when it is desired to select the neutral condition of the transmission, the valve member 65 is rotated to a position in which neither of bores 67 and 72 is connected to either one of the fifth passageway 60 and the third passageway 41, respectively. Thereby, neither of the clutches 2, 3 will be activated.

Regardless of the position of the valve member 65, hydraulic fluid is constantly conveyed to the second bore 21 via peripheral channel 73 which extends peripherally along a section of the valve member 65. This means that fluid is always supplied to the third internal passage 11. This fluid is used to lubricate the clutches 2, 3 and to lubricate the bearings 16.

It should be noted that a manual valve assembly according to the embodiment shown in FIG. 5 can be used independently of that illustrated in the embodiment shown in FIGS. 1–4. However, a person who is using a power transmission provided with the manual valve assembly (cf. FIG. 5) can with little effort and cost rearrange the manual valve assembly and change it to an electrically controllable one. This can be done simply by replacing the rotatable valve member 65 with the fixed valve member denoted by 33 in FIG. 2 and by adding solenoids 43 and 55.

Figure 6:
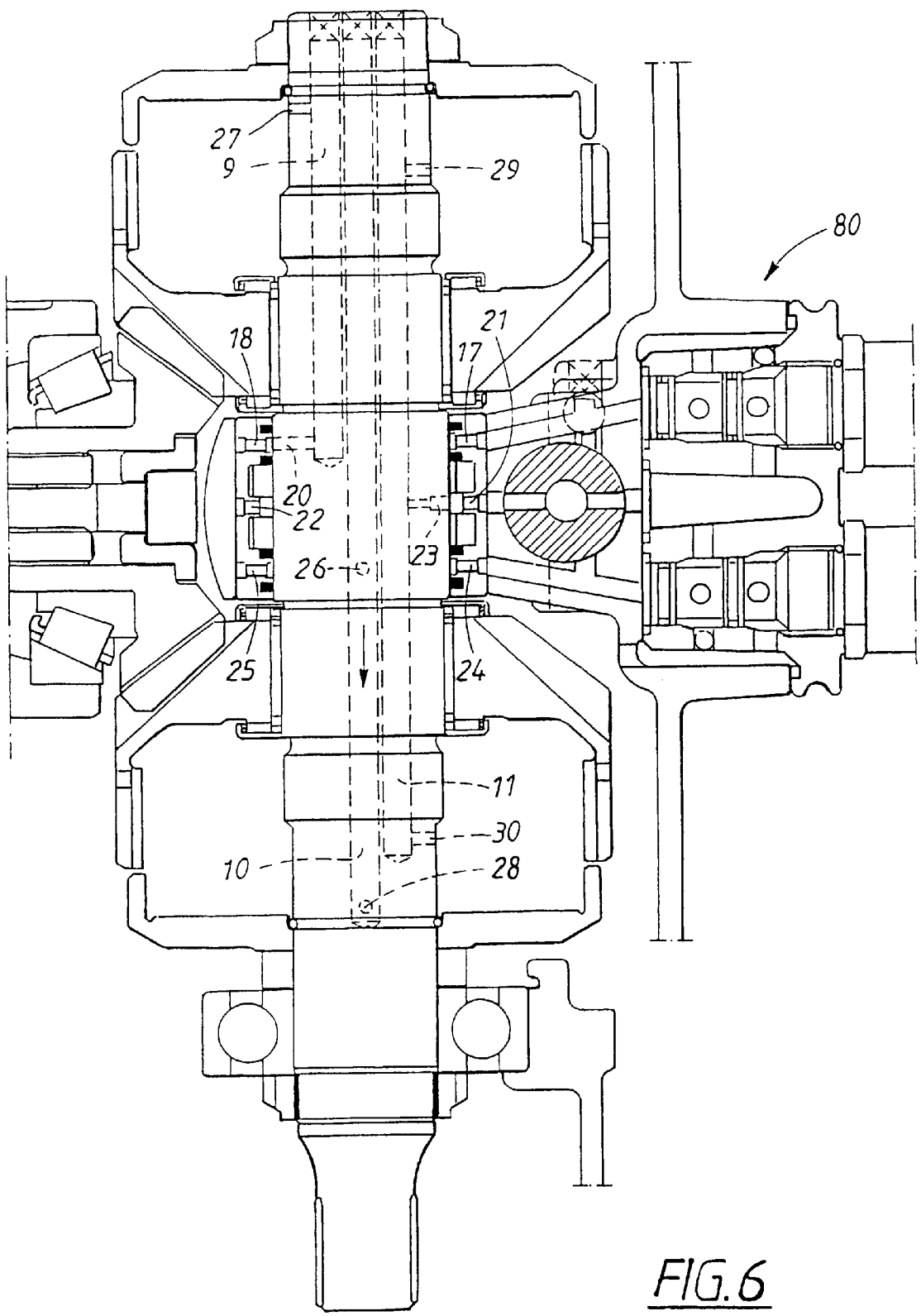
FIG. 6 illustrates an alternative embodiment of the valve assembly of FIG. 2.

An alternative embodiment of the invention is illustrated as valve assembly 80 in FIG. 6 and more clearly indicates the location of holes 20 and 27, 26 and 28, and 23 and 29 in internal passages 9, 10 and 11, respectively. Additionally, as shown, the internal passage 10 can be longer or shorter than internal passage 11.

The invention is not restricted to the embodiments described above and shown in the drawings, but may be varied within the scope of the appended claims. For example, the control of the solenoids 52, 56 (FIG. 2) can be carried out from more than one remote location in a vessel, simply by adding several remote control units 96 which are connected to solenoids 52, 56. Also, it should be noted that the four sets of holes 45, 46, 57, 58 as described may also comprise one or more holes.

A transmission assembly for a marine vessel and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the marine industries.

What is claimed and desired to be secured by Letters Patent is as follows:

1. An electrically controlled transmission system for a marine vessel adapted to avoid vibration to the vessel during a shifting process of the transmission system, said transmission system comprising:

a marine vessel having an inboard motor and an outboard propulsion drive, said motor being coupled to said propulsion drive by a transmission assembly, said transmission assembly being at least partially located within a portion of said outboard propulsion drive and being adapted to provide substantially vibration-free shifting of said transmission assembly;

said transmission assembly having a drive shaft selectively engageable with at least a forward and reverse gear of said propulsion drive for establishing forward and reverse configurations of said transmission assembly, respectively;

said transmission assembly being electrically and remotely controlled from a distance therefrom between said forward and reverse configurations utilizing electrically actuatable solenoids located proximate said transmission assembly for establishing said forward and reverse configurations of said transmission assembly thereby enabling said substantially vibration-free shifting in said transmission assembly, said actuable solenoids interconnected with a hydraulic system for affecting said forward and reverse configurations; and a first remote control located away from said transmission assembly, said first remote control being in communication with said electrically actuatable solenoids for configuring said transmission assembly between said forward and reverse configurations, and a neutral configuration.

2. The system as recited in claim 1, further comprising:

a second remote control located distantly away from said first remote control, said second remote control being in communication with said electrically actuatable solenoids for configuring said transmission assembly between said forward and reverse configurations, and a neutral configuration.

3. The system as recited in claim 2, further comprising:

electrically conductive wiring interconnected between at least said first remote control and said electrically actuatable solenoids for establishing said communication therebetween.

4. The system as recited in claim 1, wherein said electrically actuatable solenoids are located in said outboard propulsion drive.

5. The system as recited in claim 1, wherein said electrically actuatable solenoids further comprise:

two electrically actuatable solenoids, each of said electrically actuatable solenoids being independently arrangeable between actuated and unactuated configurations, said two electrically actuatable solenoids collectively having actuated and unactuated configuration combinations that correspond to said forward and reverse configurations, and a neutral configuration of said transmission assembly.

6. The system as recited in claim 5, wherein said forward configuration of said transmission assembly is arranged when each of said two electrically actuatable solenoids is in said unactuated configuration thereby together establishing said forward configuration of said transmission assembly as a fail safe configuration should electrical power to said two electrically actuatable solenoids be lost.

7. The system as recited in claim 1, wherein each of said forward and reverse gears of said transmission assembly is single ratio without a possibility for shifting between different ratio gears in either of said forward and reverse configurations.

8. The system as recited in claim 1, wherein said outboard propulsion drive is a stern propeller drive.

9. The system as recited in claim 8, wherein said propeller drive is pivotally attached to a stern of said marine vessel.

10. The system as recited in claim 1, wherein each of said electrically actuable solenoids is operatively coupled to a valve assembly, said valve assembly having a fluid inlet and a fluid outlet and at least one passage for conveying hydraulic fluid to said transmission assembly.

11. The system as recited in claim 1, further comprising:
a valve assembly for the supply of fluid to said transmission assembly, said valve assembly including:
a valve, having a fluid outlet and at least one passage for conveying the fluid to said transmission; and
at least one electrically controlled valve element, communicating with said passage, for controlling supply of said fluid to said transmission.

12. The system as recited in claim 11, further comprising:
a first passage for conveying the fluid to said transmission to select a first predetermined gear, and a second passage for conveying the fluid to said transmission to select a second predetermined gear; and
said at least one electrically controlled valve element comprising a first electrically controlled valve element communicating with said first passage for controlling supply of the fluid through said first passage, and a second electrically controlled valve element communicating with said second passage for controlling supply of the fluid through said second passage.

13. The system as recited in claim 12, each of said first and second valve elements respectively comprising a first opening which can be opened and closed for conveying fluid therethrough and which, in its open condition, defines a channel for conveying fluid through said first and second passages, respectively, to said transmission.

14. The systems as recited in claim 13, each of said first and second valve elements comprising a second opening defining first and second, vent passages, respectively, for venting the fluid to a fluid reservoir.

15. The system as recited in claim 14, said valve assembly having a first operational position in which said first valve element opens its first opening to supply the fluid through said first passage for selecting said first gear at the same time as said second valve element opens its second opening to supply the fluid through said second vent passage to a said fluid reservoir, thereby selecting said first gear of said transmission.

16. The system as recited in claim 15, said valve assembly having a second operational position in which said second valve element opens its first opening to supply the fluid through said second passage for selecting said second gear at the same time as said first valve element opens its second opening to supply the fluid through said first vent passage to a said fluid reservoir, thereby selecting said second gear of said transmission.

17. The system as recited in claim 15, said valve assembly having a third operational position in which said first valve element closes said first passage and said second valve element closes said second passage, thereby selecting a neutral condition of said transmission.

18. The system as recited in claim 17, each of said first and second valve elements comprising a piston element forming part of a solenoid device, the piston element being slidable in said valve element so as to open and close said first and second openings.

19. An electrically controlled transmission system for a marine vessel adapted to avoid vibration to the vessel during shifting and engagement of the transmission system, said transmission system comprising:
a marine vessel having an inboard motor and an outboard propulsion drive, said motor being coupled to said propulsion drive by a transmission assembly, said transmission assembly being at least partially located within a portion of said outboard propulsion drive and being adapted to provide substantially vibration-free shifting and engagement of said transmission assembly;
said transmission assembly having a drive shaft selectively engageable with at least a forward and reverse gear of said propulsion drive for establishing forward and reverse configurations of said transmission assembly, respectively;
said transmission assembly being electrically and remotely controlled from a distance therefrom between said forward and reverse configurations utilizing electrically actuatable solenoids located proximate said transmission assembly for establishing said forward and reverse configurations of said transmission assembly thereby enabling said substantially vibration-free shifting and engagement of said transmission assembly,
said actuable solenoids interconnected with a hydraulic system for affecting said forward and reverse configurations; and
a first remote control located away from said transmission assembly, said first remote control being in communication with said electrically actuatable solenoids for configuring said transmission assembly between said forward and reverse configurations, and a neutral configuration.

20. An electrically controlled transmission system for a marine vessel adapted to avoid noise and vibration being transferred to the vessel from the transmission system, said transmission system comprising:
a marine vessel having an inboard motor and an outboard propulsion drive, said motor being coupled to said propulsion drive by a transmission assembly, said transmission assembly being at least partially located within a portion of said outboard propulsion drive and being adapted to avoid noise and vibration being transferred to the vessel from said transmission assembly;
said transmission assembly having a drive shaft selectively engageable with at least a forward and reverse gear of said propulsion drive for establishing forward and reverse configurations of said transmission assembly, respectively;
said transmission assembly being electrically and remotely controlled from a distance therefrom between said forward and reverse configurations utilizing electrically actuatable solenoids located proximate said transmission assembly for establishing said forward and reverse configurations of said transmission assembly thereby enabling said avoidance of noise and vibration being transferred to the vessel from said transmission assembly;
said actuable solenoids interconnected with a hydraulic system for affecting said forward and reverse configurations; and
a first remote control located away from said transmission assembly, said first remote control being in communication with said electrically actuatable solenoids for configuring said transmission assembly between said forward and reverse configurations, and a neutral configuration.

* * * * *